(12) United States Patent
Okuyama et al.

(10) Patent No.: US 11,747,774 B2
(45) Date of Patent: Sep. 5, 2023

(54) SEARCH DEVICE, SEARCH PROGRAM, AND PLASMA PROCESSING APPARATUS

(71) Applicant: Hitachi High-Tech Corporation, Tokyo (JP)

(72) Inventors: Yutaka Okuyama, Tokyo (JP); Takeshi Ohmori, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 0 days.

(21) Appl. No.: 17/272,479

(22) PCT Filed: Dec. 3, 2019

(86) PCT No.: PCT/JP2019/047126
§ 371 (c)(1),
(2) Date: Mar. 1, 2021

(87) PCT Pub. No.: WO2021/111511
PCT Pub. Date: Jun. 10, 2021

(65) Prior Publication Data
US 2022/0291646 A1  Sep. 15, 2022

(51) Int. Cl.
*G05B 13/04* (2006.01)
*H05H 1/24* (2006.01)

(52) U.S. Cl.
CPC ......... *G05B 13/048* (2013.01); *G05B 13/042* (2013.01); *H05H 1/24* (2013.01)

(58) Field of Classification Search
CPC ............................ G05B 13/048; G05B 13/042
(Continued)

(56) References Cited

U.S. PATENT DOCUMENTS 5,473,532 A    12/1995  Unno et al.
5,993,050 A    11/1999  Miura
(Continued)

FOREIGN PATENT DOCUMENTS

CN    1098502 C    1/2003
CN    1720490 A    1/2006
(Continued)

OTHER PUBLICATIONS

Office Action dated May 20, 2022 in Korean Application No. 10-2021-7001392.
(Continued)

*Primary Examiner* — Jigneshkumar C Patel
(74) *Attorney, Agent, or Firm* — MILES & STOCKBRIDGE P.C.

(57) ABSTRACT

A parameter compression unit compresses first input parameter values so that a parameter restoration unit can restore the first input parameter values, and generates first compressed input parameter values in which the number of control parameters is reduced, a model learning unit learns a prediction model from learning data that is a set of the first compressed input parameter values and first output parameter values that are processing results obtained by giving the first input parameter values, as a plurality of control parameters, to a processing device, and a processing condition search unit estimates a second compressed input parameter values corresponding to target output parameter values by using the prediction model.

12 Claims, 12 Drawing Sheets

(58) Field of Classification Search
USPC .......................................................... 700/29
See application file for complete search history.

(56) References Cited

U.S. PATENT DOCUMENTS

| | | |
|---|---|---|
| 2003/0010914 A1 | 1/2003 | Takane et al. |
| 2003/0140039 A1 | 7/2003 | Ferguson et al. |
| 2004/0084727 A1* | 5/2004 | Ueda ................ H10B 41/30 257/E21.663 |
| 2008/0021571 A1 | 1/2008 | Kokotov et al. |
| 2008/0279434 A1 | 11/2008 | Cassill |
| 2009/0040216 A1* | 2/2009 | Ishiyama ................ G06T 17/20 345/419 |
| 2011/0131162 A1 | 6/2011 | Kaushal et al. |
| 2014/0222376 A1 | 8/2014 | Kao et al. |
| 2015/0161520 A1 | 6/2015 | Kaushal et al. |
| 2017/0018403 A1 | 1/2017 | Koronel |
| 2017/0153611 A1 | 6/2017 | Fujii et al. |
| 2017/0255177 A1 | 9/2017 | Tokuda et al. |
| 2019/0064751 A1 | 2/2019 | Ohmori et al. |
| 2019/0073588 A1 | 3/2019 | Kawaguchi |
| 2019/0122078 A1 | 4/2019 | Ura et al. |
| 2019/0286632 A1 | 9/2019 | Okuyama et al. |
| 2019/0295827 A1 | 9/2019 | Ohmori et al. |

FOREIGN PATENT DOCUMENTS

| | | |
|---|---|---|
| JP | H1086039 A | 4/1998 |
| JP | 2012074007 A | 4/2012 |
| JP | 2013518449 A | 5/2013 |
| JP | 2015162113 A | 9/2015 |
| JP | 2017102619 A | 6/2017 |
| JP | 2017157112 A | 9/2017 |
| JP | 2019040984 A | 3/2019 |
| JP | 2019046380 A | 3/2019 |
| JP | 2019079214 A | 5/2019 |
| JP | 2019159864 A | 9/2019 |
| JP | 2019165123 A | 9/2019 |
| KR | 10-2019-0108473 A | 9/2019 |
| TW | 201432479 A | 8/2014 |

OTHER PUBLICATIONS

Cunha et al. "Mathematical Modelling and Solution Approaches for Production Planning in a Chemical Industry" Pesquisa Operacional, Jun. 2017, vol. 37, No. 2, pp. 311-331.
Numata et al. "Experiments of a New Meta-Heuristics to Reduce the Search Space by Partially Fixing of the Solution Values—Application to Traveling Salesman Problem" Transactions of the Institute of Systems, Control and Information Engineers, vol. 17, No. 3, Mar. 2004, pp. 103-112.
Search Report dated Feb. 18, 2020 in corresponding International Applicatin No. PCT/JP2019/047126.

* cited by examiner

[FIG. 1]
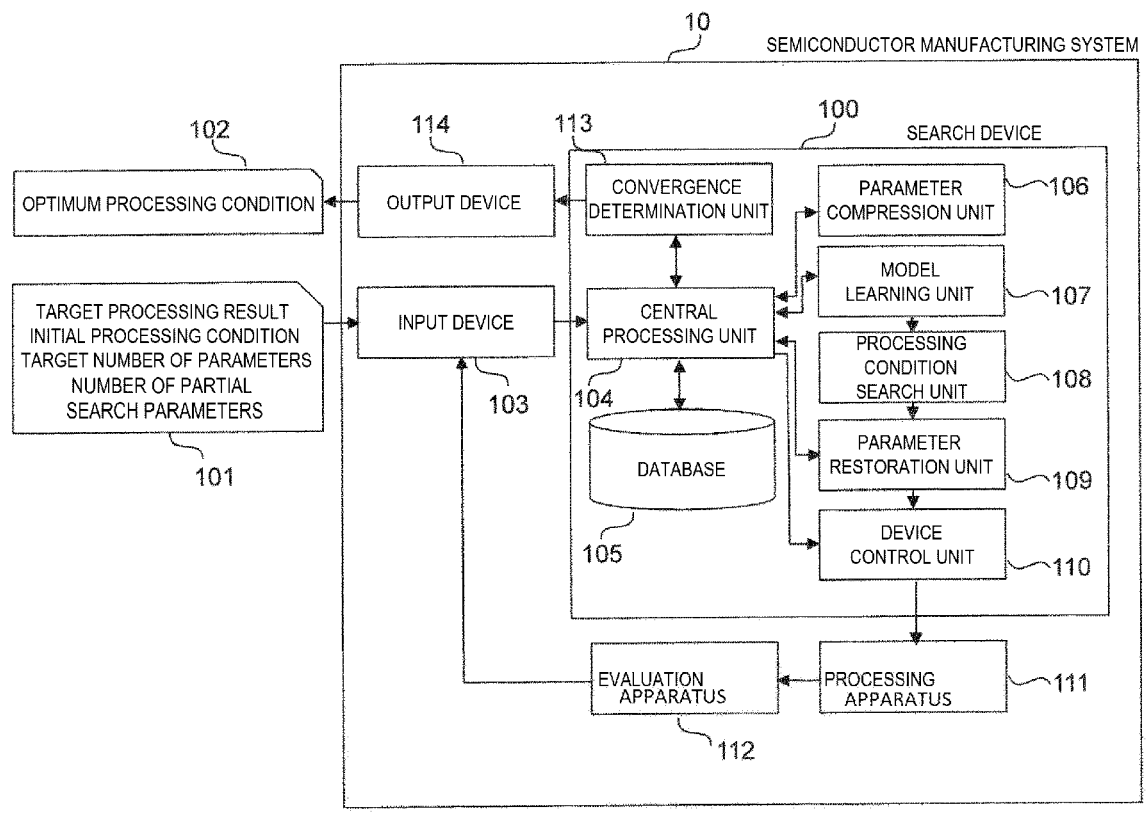
[FIG. 2]
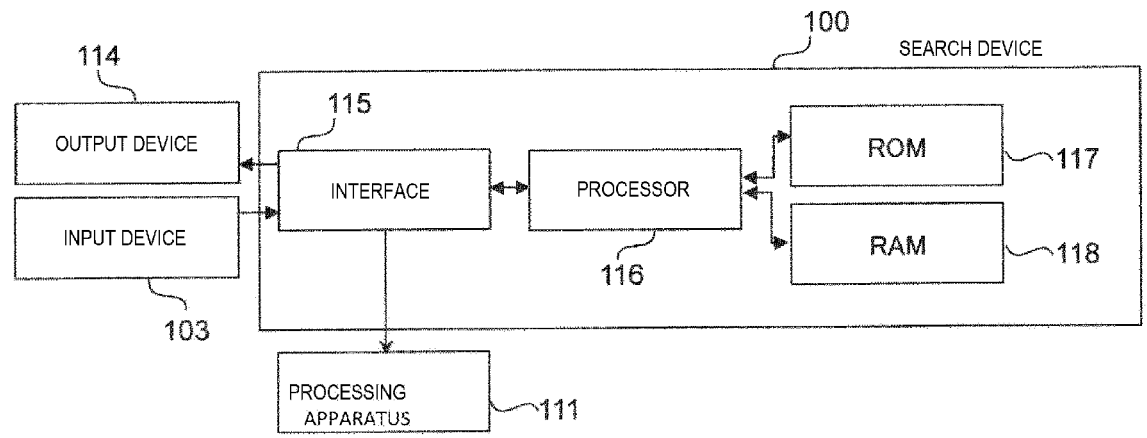

[FIG. 3]
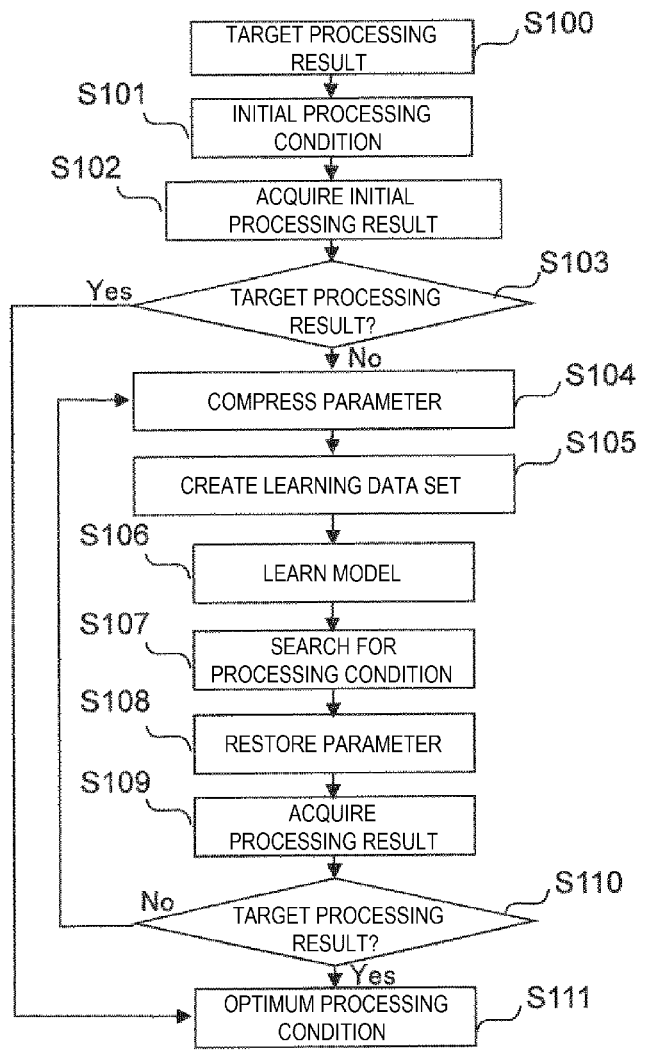

[FIG. 4A]

1 — INITIAL STAGE: 14 PARAMETERS — 400

|   | step1 | | | | | | | step2 | | | | | | |
|---|---|---|---|---|---|---|---|---|---|---|---|---|---|---|
|   | S | T | U | V | W | X | Y | S | T | U | V | W | X | Y |
| #1 | 10 |  | 100 | 10 | 12 | 20 | 15 | 10 |  | 150 | 10 | 15 | 20 | 20 |
| #2 | 20 |  | 100 | 20 | 20 | 40 | 30 | 20 |  | 150 | 20 | 20 | 40 | 30 |
| #3 | 20 |  | 100 | 20 | 20 | 40 | 30 | 20 |  | 150 | 20 | 30 | 40 | 30 |

2 — AFTER APPLYING METHOD A: 10 PARAMETERS — 401

|   | step1 | | | | | step2 | | | | |
|---|---|---|---|---|---|---|---|---|---|---|
|   | S | V | W | X | Y | S | V | W | X | Y |
| #1 | 10 | 10 | 12 | 20 | 15 | 10 | 10 | 15 | 20 | 20 |
| #2 | 20 | 20 | 20 | 40 | 30 | 20 | 20 | 20 | 40 | 30 |
| #3 | 20 | 20 | 20 | 40 | 30 | 20 | 20 | 30 | 40 | 30 |

3 — AFTER APPLYING METHOD B: 11 PARAMETERS — 402

|   | step1 | | | | | | | step2 | | | |
|---|---|---|---|---|---|---|---|---|---|---|---|
|   | S | T | U | V | W | X | Y | T | U | W | Y |
| #1 | 10 |  | 100 | 10 | 12 | 20 | 15 |  | 150 | 15 | 20 |
| #2 | 20 |  | 100 | 20 | 20 | 40 | 30 |  | 150 | 20 | 30 |
| #3 | 20 |  | 100 | 20 | 20 | 40 | 30 |  | 150 | 30 | 30 |

4 — AFTER APPLYING METHOD C: 6 PARAMETERS — 403

|   | step1 | | | | step2 | |
|---|---|---|---|---|---|---|
|   | S | T | U | W | T | W |
| #1 | 10 |  | 100 | 12 |  | 15 |
| #2 | 20 |  | 100 | 20 |  | 20 |
| #3 | 20 |  | 100 | 20 |  | 30 |

5 — AFTER APPLYING METHOD D: 5 PARAMETERS — 404

|   | step1 | | | step2 | |
|---|---|---|---|---|---|
|   | S | T | U | T | W |
| #1 | 10 |  | 100 |  | 15 |
| #2 | 20 |  | 100 |  | 20 |
| #3 | 20 |  | 100 |  | 30 |

6 — AFTER APPLYING METHODS A AND D: 2 PARAMETERS — 405

|   | step1 | step2 |
|---|---|---|
|   | S | W |
| #1 | 10 | 15 |
| #2 | 20 | 20 |
| #3 | 20 | 30 |

[FIG. 4B]
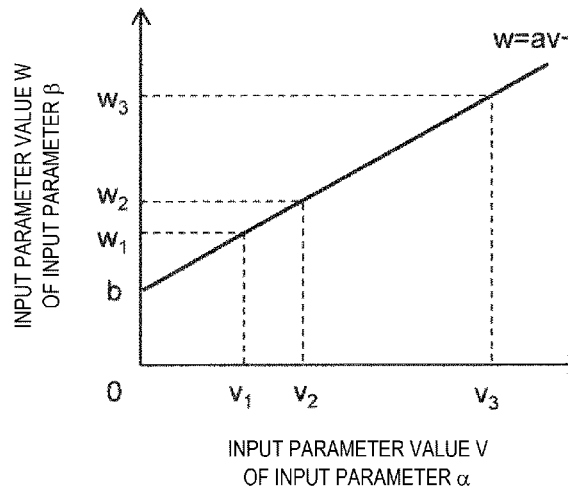
[FIG. 5]
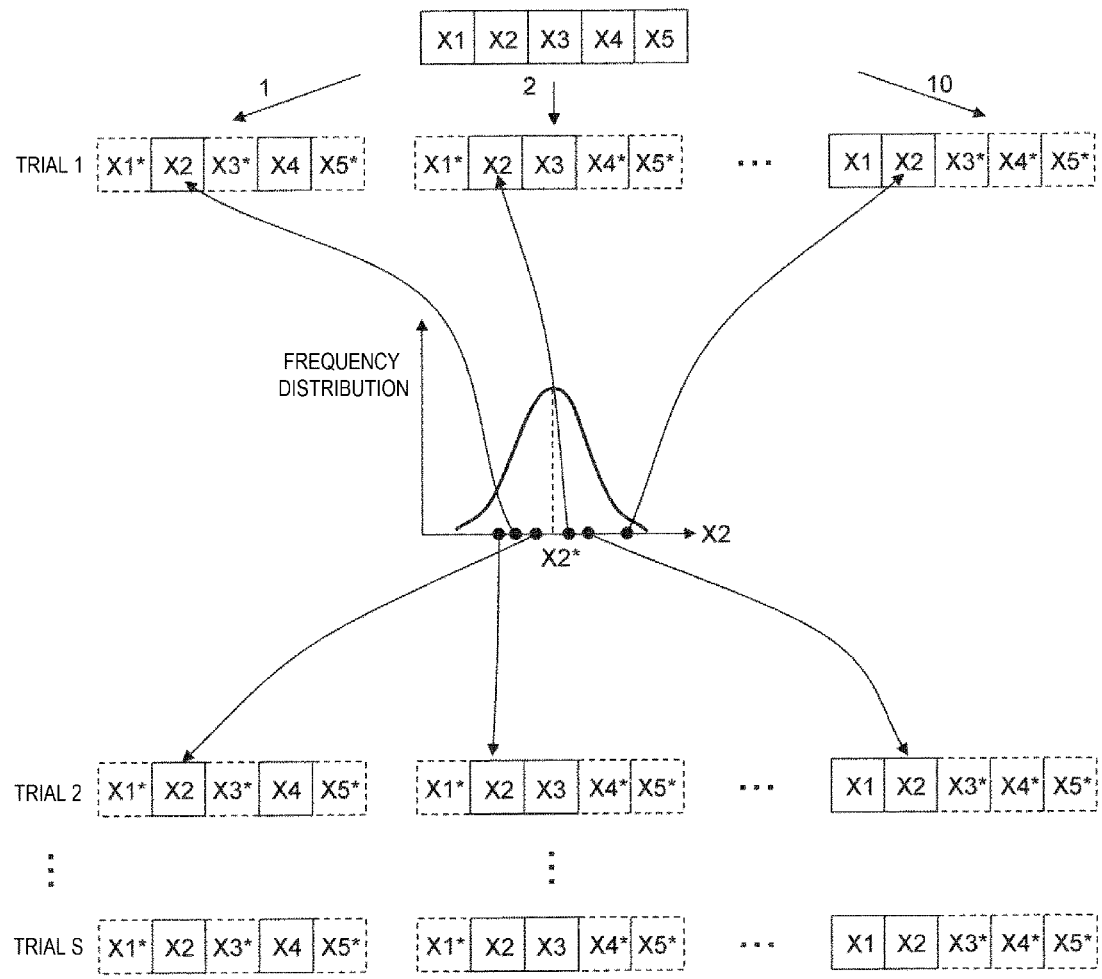

[FIG. 6]
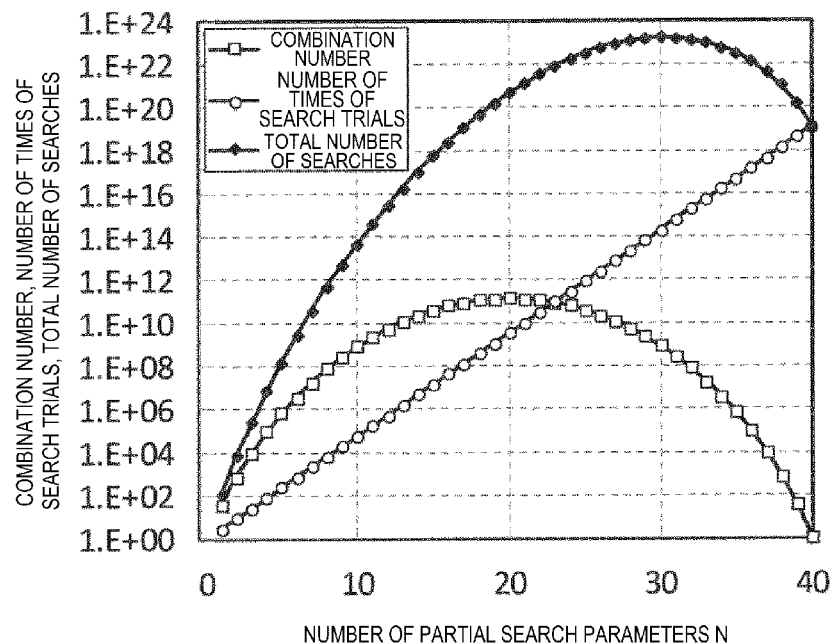
[FIG. 7]
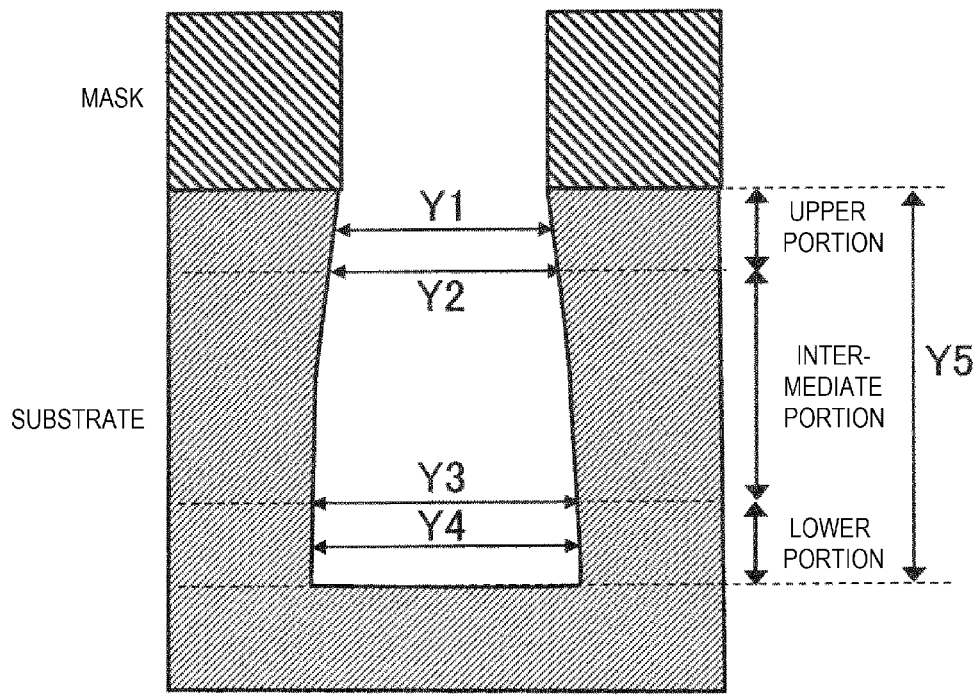

[FIG. 8]

| OUTPUT PARAMETER | Y1 | Y2 | Y3 | Y4 | Y5 |
|---|---|---|---|---|---|
| TARGET VALUE [nm] | 20 | 20 | 20 | 20 | 200 |

[FIG. 9]

|  | GAS TYPE 1 | GAS TYPE 2 | GAS TYPE 3 | GAS TYPE 4 | GAS TYPE 5 | GAS TYPE 6 | ... |
|---|---|---|---|---|---|---|---|
| MAXIMUM VALUE | 500 | 500 | 0 | 200 | 20 | 10 |  |
| MINIMUM VALUE | 0 | 0 | 0 | 0 | 0 | 0 |  |

| GAS PRESSURE 1 | GAS PRESSURE 2 | MW POWER | MW DUTY | MW FREQUENCY | RF POWER | RF DUTY | RF FREQUENCY | ... |
|---|---|---|---|---|---|---|---|---|
| 2 | 55 | 1400 | 70 | 1000 | 350 | 50 | 1000 |  |
| 0 | 5 | 400 | 0 | 0 | 0 | 5 | 100 |  |

| TEMPERATURE 1 | TEMPERATURE 2 | TEMPERATURE 3 | TEMPERATURE 4 | TEMPERATURE 5 | TEMPERATURE 6 | ETCHING TIME | DISCHARGE MODE |
|---|---|---|---|---|---|---|---|
| 40 | 40 | 40 | 40 | 40 | 40 | 170 | 2 |
| 20 | 0 | 0 | 20 | 0 | 0 | 0 | 0 |

[FIG. 10]

| step | GAS TYPE 1 | GAS TYPE 2 | GAS TYPE 3 | GAS TYPE 4 | GAS TYPE 5 | GAS TYPE 6 |
|---|---|---|---|---|---|---|
| 1 | 75 |  |  |  |  |  |
| 2 | 148 |  |  |  |  |  |
| 3 | 100 |  |  |  |  |  |
| 4 | 75 |  |  |  |  |  |
| 5 | 148 |  |  |  |  |  |
| 6 | 100 |  |  |  |  |  |
| 7 | 150 |  |  |  |  |  |

| GAS PRESSURE 1 | GAS PRESSURE 2 | MW POWER | MW DUTY | MW FREQUENCY | RF POWER | RF DUTY | RF FREQUENCY | ... |
|---|---|---|---|---|---|---|---|---|
| 0.2 | 29.0 | 1000 |  |  | 50 |  |  |  |
| 0.2 | 43.3 | 800 |  |  | 100 | 20 | 1000 |  |
| 0.8 | 11.3 | 800 |  |  | 25 |  |  |  |
| 0.2 | 29.0 | 1000 |  |  | 50 |  |  |  |
| 0.2 | 43.3 | 800 |  |  | 100 | 20 | 1000 |  |
| 0.8 | 11.3 | 800 |  |  | 25 |  |  |  |
|  | 18.8 | 450 |  |  | 0 |  |  |  |

| TEMPERATURE 1 | TEMPERATURE 2 | TEMPERATURE 3 | TEMPERATURE 4 | TEMPERATURE 5 | TEMPERATURE 6 | ETCHING TIME | DISCHARGE MODE |
|---|---|---|---|---|---|---|---|
| 40 |  |  | 40 |  |  | 40 | 0 |
| 40 |  |  | 40 |  |  | 0 | 2 |
| 40 |  |  | 40 |  |  | 20 | 2 |
| 40 |  |  | 40 |  |  | 40 | 2 |
| 40 |  |  | 40 |  |  | 0 | 2 |
| 40 |  |  | 40 |  |  | 20 | 2 |
| 40 |  |  | 40 |  |  | 1 | 2 |

[FIG. 11]

|  | Y1 | Y2 | Y3 | Y4 | Y5 |
|---|---|---|---|---|---|
| SAMPLE 1 | 28.3 | 26.0 | 46.0 | 52.8 | 218.0 |
| SAMPLE 2 | 28.0 | 30.0 | 41.0 | 47.4 | 197.0 |
| SAMPLE 3 | 23.5 | 28.0 | 40.0 | 46.7 | 196.0 |
| SAMPLE 4 | 24.3 | 27.0 | 42.0 | 46.3 | 164.0 |
| SAMPLE 5 | 28.8 | 35.0 | 48.0 | 53.6 | 187.0 |
| SAMPLE 6 | 32.5 | 36.0 | 48.0 | 54.5 | 194.0 |
| SAMPLE 7 | 30.6 | 25.0 | 39.0 | 47.6 | 226.0 |
| SAMPLE 8 | 33.7 | 30.0 | 43.0 | 49.3 | 227.0 |
| SAMPLE 9 | 22.5 | 26.0 | 44.0 | 50.9 | 236.0 |
| SAMPLE 10 | 29.9 | 26.0 | 43.0 | 46.0 | 224.0 |
| SAMPLE 11 | 22.1 | 21.0 | 47.0 | 40.5 | 213.0 |
| SAMPLE 12 | 24.7 | 24.0 | 45.0 | 40.2 | 193.0 |
| SAMPLE 13 | 28.3 | 23.0 | 41.0 | 48.7 | 247.0 |
| SAMPLE 14 | 32.4 | 29.0 | 44.0 | 48.9 | 239.0 |
| SAMPLE 15 | 28.4 | 30.0 | 41.0 | 47.3 | 226.0 |
| SAMPLE 16 | 28.4 | 33.0 | 45.0 | 50.7 | 223.0 |

[FIG. 12]

| STAGE | NUMBER OF PARAMETERS |
|---|---|
| INITIAL | 504 |
| AFTER A | 117 |
| AFTER A + B | 86 |
| AFTER A + B + C | 42 |
| AFTER A + B + C + D | 40 |

[FIG. 13]

| | step1 | | | | | | step2 | | | | | | | |
|---|---|---|---|---|---|---|---|---|---|---|---|---|---|---|
| No. | GAS TYPE 1 | MW POWER | RF POWER | RF DUTY | RF FREQUENCY | ETCHING TIME | GAS TYPE 1 | GAS PRESSURE 2 | MW POWER | MW DUTY | MW FREQUENCY | RF POWER | RF DUTY | RF FREQUENCY | ETCHING TIME |
| SAMPLE 1 | 75 | 1000 | 50 | 0 | 0 | 48 | 148 | 43.3 | 800 | 0 | 0 | 100 | 20 | 1000 | 0 |
| SAMPLE 2 | 75 | 1000 | 50 | 0 | 0 | 48 | 148 | 43.3 | 800 | 0 | 0 | 100 | 20 | 1000 | 0 |
| SAMPLE 3 | 75 | 1000 | 50 | 0 | 0 | 48 | 148 | 43.3 | 800 | 0 | 0 | 100 | 20 | 1000 | 0 |
| SAMPLE 4 | 75 | 1000 | 50 | 0 | 0 | 48 | 148 | 43.3 | 800 | 0 | 0 | 100 | 20 | 1000 | 0 |
| SAMPLE 5 | 75 | 1000 | 50 | 0 | 0 | 48 | 148 | 43.3 | 800 | 0 | 0 | 100 | 20 | 1000 | 0 |
| SAMPLE 6 | 0 | 500 | 5 | 5 | 100 | 25 | 115.2 | 30.5 | 600 | 50 | 1000 | 250 | 30 | 1000 | 60 |
| SAMPLE 7 | 75 | 1000 | 50 | 0 | 0 | 40 | 148 | 43.3 | 800 | 0 | 0 | 100 | 20 | 1000 | 0 |
| SAMPLE 8 | 75 | 1000 | 50 | 0 | 0 | 40 | 148 | 43.3 | 800 | 0 | 0 | 100 | 20 | 1000 | 0 |
| SAMPLE 9 | 75 | 1000 | 50 | 0 | 0 | 40 | 148 | 43.3 | 800 | 0 | 0 | 100 | 20 | 1000 | 0 |
| SAMPLE 10 | 75 | 1000 | 50 | 0 | 0 | 40 | 148 | 43.3 | 800 | 0 | 0 | 100 | 20 | 1000 | 0 |
| SAMPLE 11 | 75 | 1000 | 50 | 0 | 0 | 40 | 148 | 43.3 | 800 | 0 | 0 | 100 | 20 | 1000 | 0 |
| SAMPLE 12 | 75 | 1000 | 50 | 0 | 0 | 40 | 148 | 43.3 | 800 | 0 | 0 | 100 | 20 | 1000 | 0 |
| SAMPLE 13 | 75 | 1000 | 50 | 0 | 0 | 40 | 148 | 43.3 | 800 | 0 | 0 | 100 | 20 | 1000 | 0 |
| SAMPLE 14 | 75 | 1000 | 200 | 25 | 1000 | 40 | 148 | 43.3 | 800 | 0 | 0 | 100 | 20 | 1000 | 0 |
| SAMPLE 15 | 75 | 400 | 50 | 0 | 0 | 40 | 148 | 43.3 | 800 | 0 | 0 | 100 | 20 | 1000 | 0 |
| SAMPLE 16 | 75 | 1000 | 200 | 25 | 1000 | 48 | 0 | 19.3 | 800 | 0 | 0 | 5 | 0 | 0 | 30 |

| step3 | | | | | | | | | | | | step4 | | | | | |
|---|---|---|---|---|---|---|---|---|---|---|---|---|---|---|---|---|---|
| GAS TYPE 1 | GAS TYPE 5 | GAS TYPE 9 | GAS TYPE 12 | GAS TYPE 16 | GAS PRESSURE 1 | GAS PRESSURE 2 | RF POWER | RF DUTY | RF FREQUENCY | ETCHING TIME | GAS TYPE 1 | MW POWER | RF POWER | RF DUTY | RF FREQUENCY | DISCHARGE MODE |
| 0 | 0 | 5 | 0 | 50 | 0.2 | 19.8 | 100 | 50 | 1000 | 20 | 0 | 0 | 0 | 0 | 0 | 0 |
| 50 | 0 | 10 | 0 | 0 | 0.8 | 5.0 | 5 | 0 | 0 | 20 | 0 | 0 | 0 | 0 | 0 | 0 |
| 100 | 0 | 20 | 0 | 0 | 0.8 | 11.3 | 5 | 0 | 0 | 40 | 0 | 0 | 0 | 0 | 0 | 0 |
| 0 | 0 | 20 | 100 | 0 | 0.8 | 11.3 | 5 | 0 | 0 | 20 | 0 | 0 | 0 | 0 | 0 | 0 |
| 0 | 0 | 0 | 100 | 0 | 0.2 | 18.2 | 100 | 50 | 1000 | 20 | 0 | 0 | 0 | 0 | 0 | 0 |
| 100 | 0 | 20 | 0 | 0 | 0.8 | 11.3 | 5 | 0 | 0 | 20 | 0 | 0 | 0 | 0 | 0 | 0 |
| 115 | 0 | 5 | 0 | 0 | 0.8 | 11.3 | 5 | 0 | 0 | 20 | 75 | 1000 | 50 | 0 | 0 | 2 |
| 230 | 0 | 10 | 0 | 0 | 0.8 | 21.2 | 5 | 0 | 0 | 20 | 75 | 1000 | 50 | 0 | 0 | 2 |
| 100 | 0 | 20 | 0 | 0 | 0.8 | 11.3 | 5 | 0 | 0 | 10 | 75 | 1000 | 50 | 0 | 0 | 2 |
| 100 | 0 | 20 | 0 | 0 | 0.2 | 36.0 | 5 | 0 | 0 | 20 | 75 | 1000 | 50 | 0 | 0 | 2 |
| 200 | 0 | 40 | 0 | 0 | 1.2 | 14.9 | 5 | 0 | 0 | 20 | 75 | 1000 | 50 | 0 | 0 | 2 |
| 100 | 0 | 20 | 0 | 0 | 0.8 | 11.3 | 25 | 0 | 0 | 20 | 75 | 1000 | 50 | 0 | 0 | 2 |
| 100 | 10 | 20 | 0 | 0 | 0.8 | 11.3 | 5 | 0 | 0 | 20 | 75 | 1000 | 50 | 0 | 0 | 2 |
| 100 | 0 | 20 | 0 | 0 | 1.6 | 5.0 | 5 | 0 | 0 | 20 | 75 | 1000 | 200 | 25 | 1000 | 2 |
| 100 | 0 | 20 | 0 | 0 | 1.6 | 5.0 | 5 | 0 | 0 | 20 | 75 | 400 | 50 | 0 | 0 | 2 |
| 100 | 0 | 0 | 0 | 0 | 0.8 | 11.3 | 5 | 0 | 0 | 20 | 0 | 0 | 0 | 0 | 0 | 0 |

| step5 | | step6 | | | | | |
|---|---|---|---|---|---|---|---|
| RF DUTY | RF FREQUENCY | GAS TYPE 1 | GAS TYPE 9 | GAS PRESSURE 1 | GAS PRESSURE 2 | RF POWER | ETCHING TIME |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 20 | 1000 | 115 | 5 | 0.8 | 11.3 | 5 | 20 |
| 20 | 1000 | 230 | 10 | 0.8 | 21.2 | 5 | 20 |
| 20 | 1000 | 100 | 20 | 0.8 | 11.3 | 5 | 10 |
| 20 | 1000 | 100 | 20 | 0.2 | 36.0 | 5 | 20 |
| 20 | 1000 | 200 | 40 | 1.2 | 14.9 | 5 | 20 |
| 20 | 1000 | 100 | 20 | 0.8 | 11.3 | 25 | 20 |
| 20 | 1000 | 100 | 20 | 0.8 | 11.3 | 5 | 20 |
| 20 | 1000 | 100 | 20 | 1.6 | 5.0 | 5 | 20 |
| 20 | 1000 | 100 | 20 | 1.6 | 5.0 | 5 | 20 |
| 0 | 0 | 0 | 0 | 0 | 0 | 0 | 0 |

[FIG. 14]

| | step1 | | | | | | step2 | | | | | | | | |
|---|---|---|---|---|---|---|---|---|---|---|---|---|---|---|---|
| No. | GAS TYPE 1 | MW POWER | RF POWER | RF DUTY | RF FREQUENCY | ETCHING TIME | GAS TYPE 1 | GAS PRESSURE 2 | MW POWER | MW DUTY | MW FREQUENCY | RF POWER | RF DUTY | RF FREQUENCY | ETCHING TIME |
| RECIPE 1 | 75.0 | 1000.0 | 50.0 | 0.0 | 0.0 | 40.0 | 148.0 | 43.3 | 800.0 | 0.0 | 0.0 | 100.0 | 20.0 | 1000.0 | 0.0 |
| RECIPE 2 | 75.0 | 1000.0 | 50.0 | 0.0 | 0.0 | 40.0 | 148.0 | 43.3 | 800.0 | 0.0 | 0.0 | 100.0 | 20.0 | 1000.0 | 0.0 |
| RECIPE 3 | 75.0 | 1395.2 | 50.0 | 0.0 | 0.0 | 40.0 | 148.0 | 43.3 | 800.0 | 0.0 | 0.0 | 100.0 | 20.0 | 1000.0 | 0.0 |
| RECIPE 4 | 75.0 | 1000.0 | 50.0 | 0.0 | 0.0 | 40.0 | 148.0 | 43.3 | 800.0 | 0.0 | 0.0 | 100.0 | 20.0 | 1000.0 | 0.0 |
| RECIPE 5 | 75.0 | 1000.0 | 50.0 | 0.0 | 0.0 | 40.0 | 148.0 | 43.3 | 800.0 | 0.0 | 0.0 | 100.0 | 20.0 | 1000.0 | 0.0 |
| RECIPE 6 | 75.0 | 1000.0 | 50.0 | 0.0 | 1000.0 | 40.0 | 148.0 | 43.3 | 800.0 | 0.0 | 0.0 | 100.0 | 10.0 | 1000.0 | 0.0 |
| RECIPE 7 | 75.0 | 1000.0 | 50.0 | 0.0 | 0.0 | 53.1 | 148.0 | 43.3 | 800.0 | 0.0 | 0.0 | 100.0 | 20.0 | 1000.0 | 0.0 |
| RECIPE 8 | 75.0 | 1000.0 | 50.0 | 0.0 | 0.0 | 40.0 | 148.0 | 43.3 | 1028.9 | 0.0 | 0.0 | 100.0 | 20.0 | 1000.0 | 0.0 |
| RECIPE 9 | 75.0 | 1000.0 | 50.0 | 0.0 | 1000.0 | 40.0 | 148.0 | 43.3 | 800.0 | 0.0 | 0.0 | 100.0 | 20.0 | 1000.0 | 0.0 |
| RECIPE 10 | 75.0 | 1368.6 | 50.0 | 0.0 | 0.0 | 40.0 | 148.0 | 43.3 | 800.0 | 0.0 | 0.0 | 100.0 | 20.0 | 1000.0 | 0.0 |

| step3 | | | | | | | | | | | step4 | | | | | |
|---|---|---|---|---|---|---|---|---|---|---|---|---|---|---|---|---|
| GAS TYPE 1 | GAS TYPE 5 | GAS TYPE 9 | GAS TYPE 12 | GAS TYPE 16 | GAS PRESSURE 1 | GAS PRESSURE 2 | RF POWER | RF DUTY | RF FREQUENCY | ETCHING TIME | GAS TYPE 1 | MW POWER | RF POWER | RF DUTY | RF FREQUENCY | DISCHARGE MODE |
| 100.0 | 0.0 | 20.0 | 0.0 | 37.6 | 0.8 | 11.3 | 25.0 | 0.0 | 0.0 | 38.3 | 75.0 | 1000.0 | 50.0 | 0.0 | 0.0 | 2.0 |
| 100.0 | 0.0 | 20.0 | 0.0 | 0.0 | 0.8 | 11.3 | 25.0 | 0.0 | 0.0 | 20.0 | 75.0 | 1000.0 | 50.0 | 0.0 | 0.0 | 2.0 |
| 100.0 | 0.0 | 20.0 | 0.0 | 0.0 | 0.8 | 11.3 | 25.0 | 0.0 | 0.0 | 39.0 | 75.0 | 1000.0 | 50.0 | 0.0 | 0.0 | 2.0 |
| 100.0 | 0.0 | 20.0 | 0.0 | 0.0 | 0.8 | 6.5 | 25.0 | 0.0 | 0.0 | 45.7 | 75.0 | 1000.0 | 50.0 | 0.0 | 0.0 | 0.0 |
| 100.0 | 0.0 | 20.0 | 0.0 | 0.0 | 0.8 | 11.3 | 25.0 | 0.0 | 0.0 | 35.8 | 75.0 | 1000.0 | 50.0 | 0.0 | 0.0 | 2.0 |
| 100.0 | 0.0 | 20.0 | 0.0 | 0.0 | 0.8 | 11.3 | 25.0 | 0.0 | 0.0 | 44.2 | 75.0 | 1000.0 | 50.0 | 0.0 | 0.0 | 1.0 |
| 100.0 | 0.0 | 20.0 | 0.0 | 0.0 | 0.8 | 11.3 | 25.0 | 0.0 | 0.0 | 32.9 | 75.0 | 1000.0 | 50.0 | 0.0 | 0.0 | 2.0 |
| 100.0 | 0.0 | 20.0 | 0.0 | 0.0 | 1.8 | 11.3 | 25.0 | 0.0 | 0.0 | 31.0 | 75.0 | 1000.0 | 50.0 | 0.0 | 0.0 | 2.0 |
| 100.0 | 0.0 | 20.0 | 0.0 | 0.0 | 0.8 | 11.3 | 25.0 | 0.0 | 0.0 | 38.5 | 75.0 | 1000.0 | 50.0 | 0.0 | 0.0 | 2.0 |
| 100.0 | 0.0 | 20.0 | 0.0 | 0.0 | 0.8 | 11.3 | 25.0 | 0.0 | 0.0 | 36.6 | 0.0 | 1000.0 | 50.0 | 0.0 | 0.0 | 2.0 |

| step5 | | step6 | | | | | |
|---|---|---|---|---|---|---|---|
| RF DUTY | RF FREQUENCY | GAS TYPE 1 | GAS TYPE 9 | GAS PRESSURE 1 | GAS PRESSURE 2 | RF POWER | ETCHING TIME |
| 20.0 | 1000.0 | 100.0 | 5.0 | 0.8 | 11.3 | 10.7 | 20.0 |
| 20.0 | 1000.0 | 100.0 | 20.0 | 0.7 | 8.3 | 2.5 | 43.2 |
| 5.0 | 1000.0 | 100.0 | 8.1 | 0.8 | 11.3 | 25.0 | 20.0 |
| 20.0 | 1000.0 | 100.0 | 20.0 | 0.8 | 11.3 | 8.7 | 20.0 |
| 20.0 | 1000.0 | 100.0 | 20.0 | 0.4 | 8.2 | 25.0 | 25.5 |
| 20.0 | 1000.0 | 100.0 | 20.0 | 0.8 | 11.3 | 25.0 | 20.0 |
| 20.0 | 1000.0 | 100.0 | 20.0 | 0.8 | 27.3 | 25.0 | 32.2 |
| 20.0 | 1000.0 | 100.0 | 20.0 | 0.8 | 11.3 | 25.0 | 20.0 |
| 20.0 | 1000.0 | 0.0 | 20.0 | 0.8 | 11.3 | 25.0 | 38.8 |
| 20.0 | 1000.0 | 100.0 | 5.0 | 0.8 | 11.3 | 25.0 | 20.0 |

[FIG. 15]

| OUTPUT PARAMETER | Y1 | Y2 | Y3 | Y4 | Y5 |
|---|---|---|---|---|---|
| RECIPE 1 | 26.9 | 20.7 | 40.4 | 44.0 | 217.3 |
| RECIPE 2 | 28.1 | 23.9 | 42.0 | 45.0 | 222.6 |
| RECIPE 3 | 24.5 | 21.8 | 42.6 | 39.1 | 188.2 |
| RECIPE 4 | 25.4 | 24.0 | 41.0 | 42.2 | 206.0 |
| RECIPE 5 | 24.9 | 23.2 | 42.9 | 39.5 | 194.3 |
| RECIPE 6 | 25.1 | 24.0 | 42.9 | 39.1 | 195.5 |
| RECIPE 7 | 26.6 | 23.4 | 42.6 | 38.3 | 194.4 |
| RECIPE 8 | 24.8 | 23.4 | 42.4 | 39.3 | 194.8 |
| RECIPE 9 | 26.1 | 23.3 | 42.3 | 38.8 | 197.3 |
| RECIPE 10 | 24.9 | 22.3 | 42.7 | 39.5 | 187.6 |

[FIG. 16]
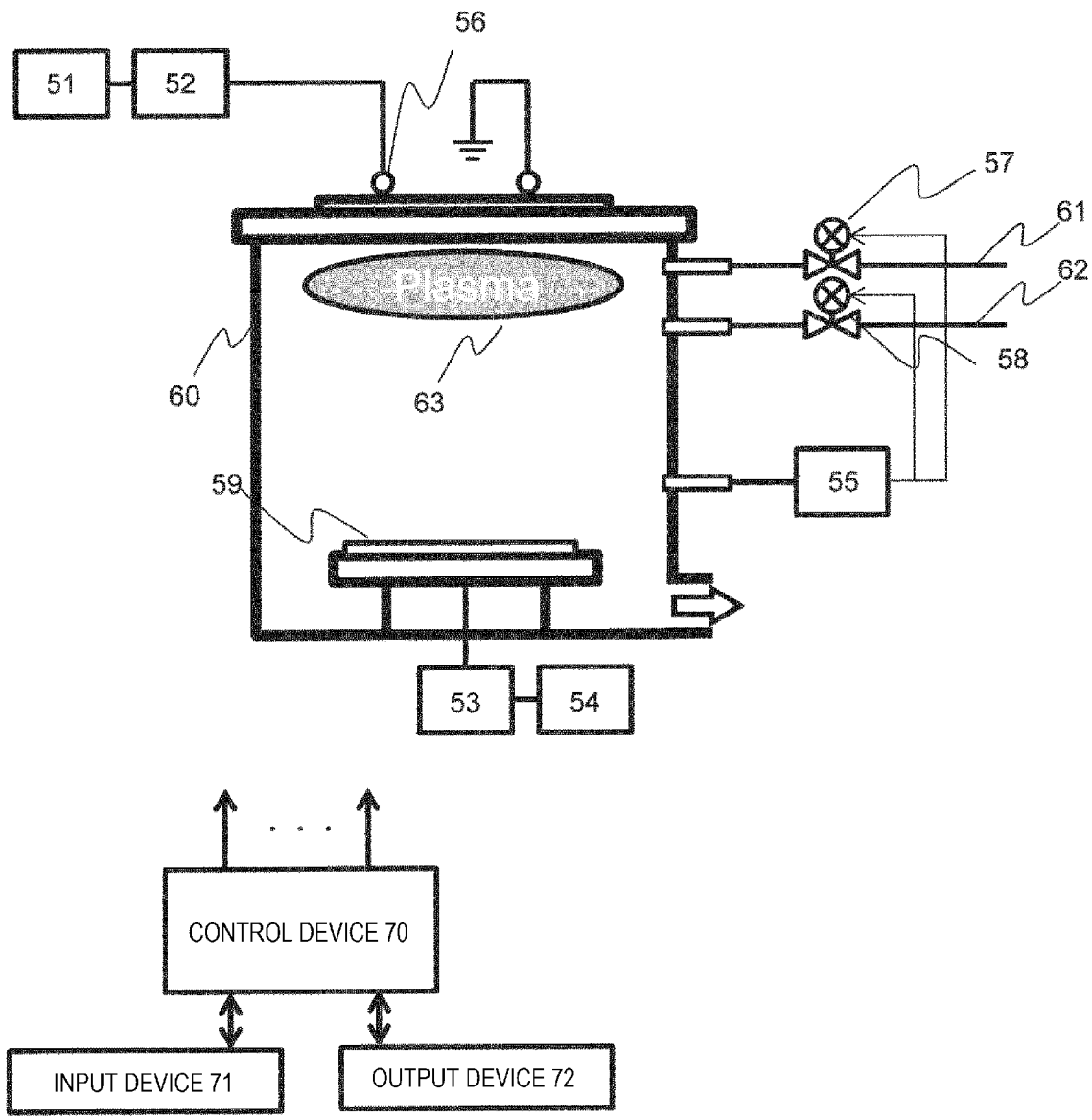

[FIG. 17]
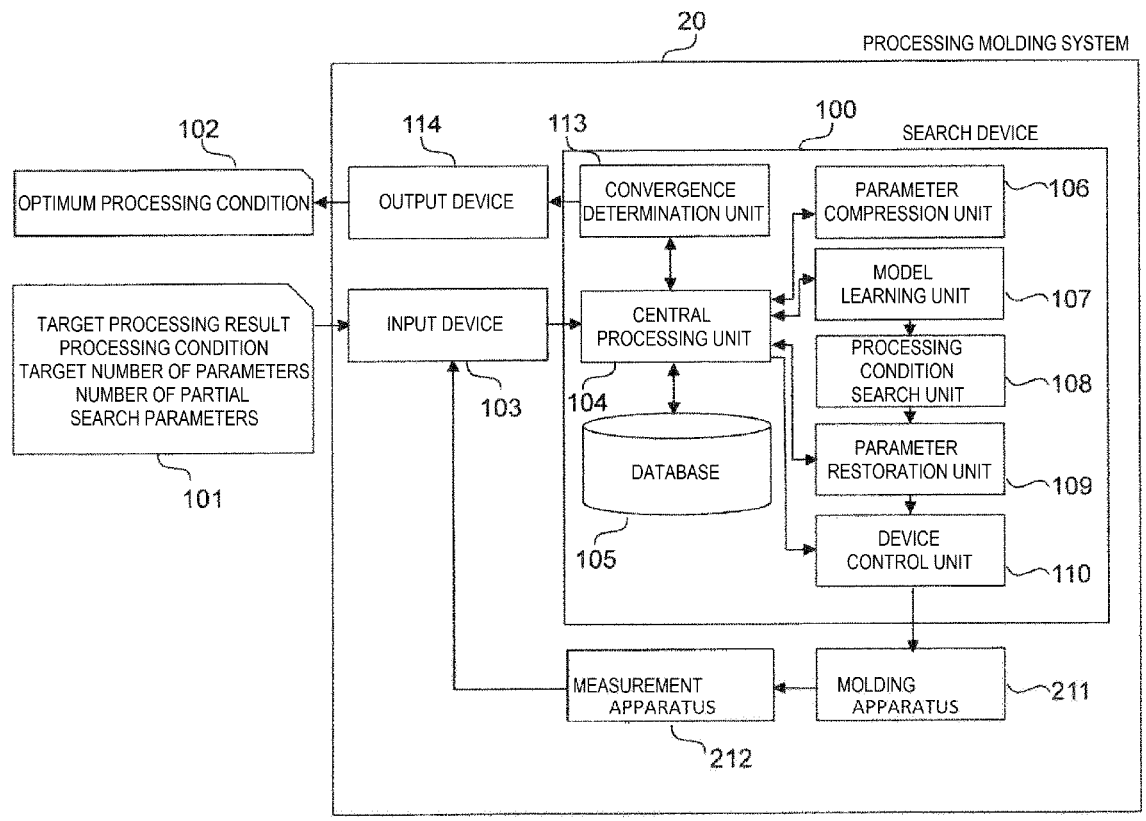
[FIG. 18]
| SAMPLE | PLASTICIZATION | | | INJECTION | PRESSURE HOLDING | COOLING |
|---|---|---|---|---|---|---|
| | CYLINDER TEMPERATURE | MOTOR ROTATION SPEED | CYLINDER PRESSURE | SCREW SPEED | RESIN PRESSURE | MOLD TEMPERATURE |
| 1 | A1 | B1 | C1 | D1 | E1 | F1 |
| 2 | A2 | B2 | C2 | D2 | E2 | F1 |
| 3 | A3 | B3 | C3 | D2 | E3 | F1 |

[FIG. 19]

| No. | SAMPLE 1 | | | | | SAMPLE 2 | | | SAMPLE 3 | |
|---|---|---|---|---|---|---|---|---|---|---|
| | CYLINDER TEMPERATURE | MOTOR ROTATION SPEED | CYLINDER PRESSURE | INJECTION | COOLING | CYLINDER TEMPERATURE | MOTOR ROTATION SPEED | CYLINDER PRESSURE | CYLINDER TEMPERATURE | CYLINDER PRESSURE |
| SAMPLE 1 | A1 | B1 | C1 | D1 | E1 | A2 | B2 | C2 | A3 | C3 |
| SAMPLE 2 | A1 | B1 | C1 | D1 | E1 | A2 | B2' | C2' | A3' | C3 |
| SAMPLE 3 | A1 | B1 | C1 | D1' | E1 | A2' | B2 | C2" | A3" | C3' |
| SAMPLE 4 | A1' | B1' | C1 | D1' | E1' | A2' | B2' | C2 | A3 | C3" |
| SAMPLE 5 | A1 | B1' | C1 | D1 | E1' | A2 | B2" | C2" | A3' | C3" |
| SAMPLE 6 | A1 | B1 | C1' | D1" | E1" | A2 | B2'" | C2 | A3 | C3" |
| SAMPLE 7 | A1" | B1 | C1' | D1 | E1 | A2' | B2 | C2' | A3 | C3' |
| SAMPLE 8 | A1 | B1" | C1' | D1' | E1 | A2' | B2' | C2 | A3" | C3" |
| SAMPLE 9 | A1 | B1 | C1 | D1 | E1' | A2" | B2" | C2 | A3' | C3' |
| SAMPLE 10 | A1 | B1' | C1' | D1 | E1' | A2" | B2 | C2 | A3 | C3" |

SEARCH DEVICE, SEARCH PROGRAM, AND PLASMA PROCESSING APPARATUS

TECHNICAL FIELD

The present invention relates to a search device for searching for an optimum solution, a search program, and a plasma processing apparatus having a function of optimizing processing.

BACKGROUND ART

In recent years, in order to improve performance of a semiconductor device, a new material is introduced into the semiconductor device, and at the same time, a structure of the semiconductor device becomes three-dimensional and complicated. Processing of a current advanced semiconductor device requires nanometer level accuracy. Therefore, a semiconductor processing apparatus needs to be capable of processing various materials into various shapes with extremely high accuracy, and is inevitably an apparatus provided with a large number of control parameters (input parameters).

Accordingly, in order to fully bring out performance of the semiconductor processing apparatus, it is necessary to determine several types to several tens of types of control parameters. Accordingly, as the performance of the apparatus is improved, the apparatus becomes complicated, and it becomes more and more difficult to find out a combination of control parameters that can obtain a desired processing result. This leads to an increase in a device development time and an increase in a development cost. For this reason, there is a demand for a function or an apparatus that can search for an optimal control parameter semi-automatically and easily extract the performance of the apparatus.

PTL 1 discloses a method and an apparatus for autonomously searching for a processing condition for providing a desired processing shape by learning a model in conjunction with an etching apparatus and a processing shape evaluation apparatus.

On the other hand, when the search of the control parameter is regarded as an optimum solution search problem, it is necessary to reduce the number of search parameters or narrow down a search range for efficient search. PTL 2, PTL 3, and PTL 4 disclose methods for reducing the number of model parameters. PTL 5 and PTL 6 disclose methods for narrowing down a search range.

CITATION LIST

Patent Literature

PTL 1: JP-A-2019-040984
PTL 2: JP-A-2019-046380
PTL 3: JP-A-2015-162113
PTL 4: JP-A-2019-079214
PTL 5: JP-A-2017-157112
PTL 6: JP-A-2017-102619

SUMMARY OF INVENTION

Technical Problem

In the method of PTL 1, a learning data set including a small number of sets of processing conditions and processing results is prepared, a model is learned, and then a processing condition for giving a desired processing result is back-calculated by using the learned model. When the number of processing condition parameters is about ten, the processing conditions can be obtained in several minutes. A verification experiment is performed on the searched processing conditions, and when a desired result is not obtained, an experiment result is added to the learning data set, and the learning of the model is repeated. The learning of the model, estimation of the processing condition, and the verification by the experiment are repeated many times, and a time required for the estimation of the processing condition needs to be substantially equal to a time required for the experiment (about one hour at the maximum).

On the other hand, processing conditions (hereinafter, referred to as a recipe) of a current etching apparatus have become a multi-step type due to compounding of materials to be processed and the miniaturization and complication of shapes to be processed. With the multi-step type processing conditions, processing is performed while changing the processing conditions of the etching apparatus for each step. Since the number of steps is 10 to 30 and the number of control parameters per step is several tens, the number of control parameters to be determined reaches several hundreds in total. PTL 1 discloses that a random search method is used as a processing condition search method, but an optimum solution of a parameter space of several hundred dimensions cannot be obtained in a practical calculation time by current computing performance.

In PTL 2, a model is formed in two stages in order to make the model compact, and an output of the model in a preceding stage is compressed and used as an input parameter of a subsequent stage, so that the model in the subsequent stage is made compact, but the number of original input parameters is not reduced.

In PTL 3, duplication of model parameters is deleted to make a model compact, but the number of input parameters is not reduced.

In PTL 4, a dimension reduction method such as a principal component analysis is used, but the number of hyper parameters of a model is reduced, and input parameters are not reduced.

PTL 5 and PTL 6 use a simulator that simulates an apparatus in order to narrow down a search range of control parameters, but cannot be applied when there is no simulator.

As described above, none of the cited literatures discloses a method capable of efficiently searching a model having an enormous number of search parameters for an optimum solution. An object of the present invention is to provide a search device and a search program capable of searching a model having an enormous number of search parameters for an optimum solution in a practical time.

Solution to Problem

A search device which is an aspect of the invention is configured to search for input parameter values to be given to a plurality of control parameters set in a processing apparatus, so that a processing result of a predetermined process performed by the processing device satisfies target output parameter values, and the search device includes: a processor, a memory, and a search program stored in the memory and configured to be executed by the processor to search for the input parameter values satisfying the target output parameter values. The search program includes a parameter compression unit, a model learning unit, a processing condition search unit, a parameter restoration unit, and a convergence determination unit. The parameter compression unit compresses first input parameter values so that the parameter restoration unit can restore the first input parameter values, and generates first compressed input parameter values in which the number of control parameters is reduced, the model learning unit learns a prediction model from learning data that is a set of the first compressed input parameter values and first output parameter values that is a processing result obtained by giving the first input parameter values, as the plurality of control parameters, to the processing apparatus, and the processing condition search unit estimates second compressed input parameter values corresponding to the target output parameter values by using the prediction model, the parameter restoration unit generates second input parameter values by adding a control parameter value deleted by the parameter compression unit from the second compressed input parameter values, and the convergence determination unit determines whether second output parameter values, which is a processing result obtained by giving the second input parameter values, as the plurality of control parameters, to the processing device, converges to a predetermined range of the target output parameter values.

Advantageous Effect

Optimization can be performed in a short time even under processing conditions having enormous parameters. Problems, configurations, and effects other than those described above will become apparent from the following description of embodiments.

BRIEF DESCRIPTION OF DRAWINGS

FIG. 1 is a diagram showing a system configuration example of a semiconductor manufacturing system.

FIG. 2 is a block diagram showing a hardware configuration of a search device.

FIG. 3 is a flowchart for determining an optimum processing condition based on a target processing result.

FIG. 4A is a diagram for illustrating a method for compressing input parameters.

FIG. 4B is a diagram for illustrating a method for restoring the input parameters.

FIG. 5 is a diagram for illustrating a method for performing a partial parameter search.

FIG. 6 is a diagram showing a relationship between the number of partial search parameters and a total number of times of searches.

FIG. 7 is a diagram showing a meaning of output parameters.

FIG. 8 is a diagram showing target output values.

FIG. 9 is a diagram showing maximum/minimum allowable values of the input parameters.

FIG. 10 is a diagram showing an example of initial input parameters (for one sample).

FIG. 11 is a diagram showing output parameter values (processing result) with respect to the initial input parameters.

FIG. 12 is a diagram showing a transition of the number of parameters when parameter compression is performed.

FIG. 13 is a diagram showing input parameters (compressed input parameters) after the parameter compression is performed.

FIG. 14 is a diagram showing values of searched recipe candidates.

FIG. 15 is a diagram showing output prediction values for the searched recipe candidates.

FIG. 16 is a schematic view of a plasma etching apparatus having an optimum processing condition search function.

FIG. 17 is a diagram showing a system configuration example of a processing molding system.

FIG. 18 is a diagram showing an example of the initial input parameters (for one sample).

FIG. 19 is a diagram showing input parameters (compressed input parameters) after the parameter compression is performed.

DESCRIPTION OF EMBODIMENTS

When inventors examine a multi-step type recipe for an etching apparatus as an example, there are unused parameters or parameters having fixed values in all samples. There is no need to search these parameters. In addition, periodicity in which control parameter values alternately exchange between an odd-numbered step and an even-numbered step is often observed. Such a characteristic is seen in a process of forming a desired shape while alternately performing, for example, an etching step and a side wall protection step. Therefore, the total number of parameters is enormous, but since not all parameters are assigned independently, the number of control parameters can be reduced to some extent based on these characteristics.

However, after only this reduction, the number of parameters is still large, and searching may be difficult to perform. In this case, priority is given to performing a high-speed search by an approximate search method. Various methods, such as a mathematical analysis, are proposed for optimization problems, and there are methods that can be applied to problems with an enormous number of parameters. When a subject is ended when the parameter search is performed once and a solution is obtained, it may be acceptable for the search to take several days. However, in subjects such as recipe search, since a model is constructed based on a small amount of learning data to predict a recipe as in an autonomous search method of PTL 1, it is necessary to repeatedly add data and update the model many times. Further, since the model is created based on a small amount of learning data, prediction accuracy of the model is low with respect to a parameter value largely separated from a learning data point, so that it is meaningless to search inside such a region in detail. Therefore, it is prioritized to shorten a search time even if an approximate solution is obtained, rather than spending time on searching for an optimum solution by using a model with low accuracy.

From the above, by reducing the data as preprocessing for creating the learning data and using the approximate search method in the search for the optimum solution, it is possible to search for the optimum solution in a practical time even for a recipe having an enormous number of parameters. Embodiments of the invention will be described below with reference to the accompanying drawings.

First Embodiment

FIG. 1 is a diagram showing a system configuration example of a semiconductor manufacturing system. A semiconductor manufacturing system 10 includes a search device 100, an input device 103, an output device 114, a processing apparatus 111, and an evaluation apparatus 112.

The processing apparatus 111 is an apparatus that processes a semiconductor or a semiconductor device including a semiconductor. Processing contents of the processing apparatus 111 are not particularly limited. For example, the processing apparatus 111 includes a lithography apparatus, a film forming apparatus, a pattern processing apparatus, an ion implantation apparatus, and a cleaning apparatus. The lithography apparatus includes, for example, an exposure apparatus, an electron beam drawing apparatus, and an X-ray drawing apparatus. The film forming apparatus includes, for example, a chemical vapor deposition (CVD), a physical vapor deposition (PVD), a vapor deposition apparatus, a sputtering apparatus, and a thermal oxidation apparatus. The pattern processing apparatus includes, for example, a wet etching apparatus, a dry etching apparatus, an electron beam processing apparatus, and a laser processing apparatus. The ion implantation apparatus includes, for example, a plasma doping apparatus and an ion beam doping apparatus. The cleaning apparatus includes, for example, a liquid cleaning apparatus and an ultrasonic cleaning apparatus.

The processing apparatus 111 processes the semiconductor or the semiconductor device based on a processing condition (input parameter values) received from the search device 100, and transfers the semiconductor or the semiconductor device to the evaluation apparatus 112. The evaluation apparatus 112 measures the semiconductor or the semiconductor device processed by the processing apparatus 111, and acquires a processing result (output parameter values). The evaluation apparatus 112 includes an optical monitor and a processing dimension measuring apparatus using an electron microscope. A part of the semiconductor or semiconductor device processed by the processing apparatus 111 may be taken out as a fragment, and the fragment may be transported to the evaluation apparatus 112 for measurement.

The search device 100 includes a central processing unit 104, a database 105, a parameter compression unit 106, a model learning unit 107, a processing condition search unit 108, a parameter restoration unit 109, a device control unit 110, and a convergence determination unit 113. Contents of each block will be described later using a flowchart.

The input device 103 includes an input interface such as a GUI and a storage medium reading device such as a card reader, and inputs data to the search device 100. Further, not only an actual measured value from a user but also an actual measured value from the evaluation device 112 is received in a similar manner and input to the search device 100. The input device 103 includes, for example, a keyboard, a mouse, a touch panel, the storage medium reading device, and the like.

The output device 114 displays the processing condition transferred from the search device 100, as an optimum processing condition 102, to the user. Methods for displaying the processing condition includes displaying on a display, or writing to a file, or the like. The output device 114 includes, for example, a display, a printer, a storage medium writing device, and the like.

FIG. 2 is a block diagram showing a hardware configuration of the search device 100. The search device 100 searches for the input parameter values (processing condition) of the processing device 111 that realizes target output parameter values (target processing result) received from the input device 103. The search device 100 includes a processor 116, a communication interface 115, a ROM 117, and a RAM 118. The communication interface 115 connects the processor 116 to the external input device 103, the output device 114, and the processing device 111. The communication interface 115, the ROM 117, and the RAM 118 are connected to the processor 116. The ROM 117 stores a table showing a settable range of the input parameters for the processing device 111, a constraint condition for the parameters, a convergence determination condition, and a processing program executed by the processor 116. The RAM 118 stores the learning data generated in a search process, a learning model, and the like.

In correspondence with FIG. 1, the database 105 is implemented as the ROM 117 and the RAM 118, and each block in the search device is implemented as a program (search program) stored in the ROM 117.

FIG. 3 is a flowchart that is performed by the search device 100 in the semiconductor manufacturing system 10, and determines the optimum processing condition of the processing device based on the target processing result (target output parameter values).

First, in the processing performed by the processing apparatus 111, the target processing result (target output parameter values) as a target, an initial processing condition (initial input parameter values) to be selected as a parameter that controls the processing device, a target number of parameters, and the number of partial search parameters 101 are transferred from the input device 103 to the central processing unit 104 (step S100). The target number of parameters and the number of partial search parameters will be described later.

Next, the central processing unit 104 stores the received target processing result and the selected initial processing condition in the database 105, and transfers the selected initial processing condition to the device control unit 110 (step S101).

The device control unit 110 transfers the initial processing condition to the processing apparatus 111. Alternatively, the user may input the initial processing condition output by the device control unit 110 to the processing apparatus 111. The processing apparatus 111 performs processing according to the input initial processing condition, performs evaluation by the evaluation apparatus 112, and inputs an acquired processing result (initial processing result, initial output parameter values) to the input device 103. The central processing unit 104 receives the initial processing result from the input device 103 (step S102). The central processing unit 104 transfers the initial processing condition and the initial processing result to the convergence determination unit 113.

The convergence determination unit 113 compares the initial processing result with the target processing result, and determines whether the initial processing result converges to the target processing result within predetermined accuracy (step S103). When the initial processing result converges to the target processing result within the predetermined accuracy, the initial processing condition converging to the target processing result is transferred to the output device 114, and the output device 114 outputs the initial processing condition as the optimum processing condition 102 (step S111).

Convergence of the output parameter values (processing result) can be determined by using a sum of squares of an error between the target output parameter values and the output parameter values for all output parameters to be used, which is given by Formula 1.

$$\sum_{i=1}^{NP}(y^*_i - y_i)^2 \qquad \text{(Formula 1)}$$

Here, NP is a total number of the used output parameters, $y^*_i$ is an $i^{th}$ target output parameter value, and $y_i$ is an $i^{th}$ output parameter value (actual value).

On the other hand, when the initial processing result does not converge to the target processing result within the predetermined accuracy, an instruction for continuing the processing is sent from the convergence determination unit 113 to the central processing unit 104. The central processing unit 104 sends the initial processing condition to the parameter compression unit 106, and the parameter compression unit 106 compresses the initial processing condition (step S104). A parameter compression method will be described later using a specific example. After that, the central processing unit 104 creates learning data including the compressed initial processing condition (compressed initial input parameter values) and the initial processing result in the database 105 (step S105).

Next, the central processing unit 104 reads the learning data from the database 105 and sends the learning data to the model learning unit 107. The model learning unit 107 learns a prediction model that associates the compressed processing condition (compressed input parameter values) with the processing result (output parameter values) (step S106). As the prediction model, a neural network, a support vector machine, a kernel method, or the like can be used. The learned prediction model is transferred to the processing condition search unit 108.

Next, the processing condition search unit 108 searches for the processing condition for the target processing result read from the database 105 by using the prediction model transferred from the model learning unit 107 and the constraint condition for the input parameter read from the database 105 (step S107). In the prediction model, the processing condition is input and the processing result is output. Therefore, in order to obtain the processing condition from the processing result in reverse, a partial space search based on a random search method is performed. The partial space search method will be described later using a specific example. The processing condition search unit 108 transfers the searched processing condition (compressed added input parameter values) to the parameter restoration unit 109.

Next, the parameter restoration unit 109 restores and adds values of control parameters deleted by the parameter compression unit 106 to the transferred processing condition (step S108), transfers the restored processing condition (added input parameter values) to the device control unit 110, and the central processing unit 104 stores the restored processing condition in the database 105.

The device control unit 110 transfers the transferred processing condition (added input parameter values) to the processing apparatus 111. Alternatively, the user may input the processing condition output by the device control unit 110 to the processing apparatus 111. The processing apparatus 111 performs the processing according to the input processing condition, performs the evaluation by the evaluation apparatus 112, and inputs an acquired processing result (added output parameter values) to the input device 103. The central processing unit 104 receives the processing result from the input device 103 (step S109). The central processing unit 104 transfers the processing condition (added input parameter values) and the processing result (added output parameter values) to the convergence determination unit 113.

The convergence determination unit 113 compares the processing result (added output parameter values (actual values)) with the target processing result (target output parameter values), and determines whether the processing result converges to the target processing result within the predetermined accuracy (step S110). When the processing result converges to the target processing result within the predetermined accuracy, the processing condition converging to the target processing result is transferred to the output device 114, and the output device 114 outputs the initial processing condition as the optimum processing condition 102 (step S111).

On the other hand, when the processing result does not converge to the target processing result within the predetermined accuracy, the instruction for continuing the processing is sent from the convergence determination unit 113 to the central processing unit 104, the central processing unit 104 additionally stores a set of the processing condition (added input parameter values) and the processing result (added output parameter value (actual values)) in a learning data set of the database 105, and transfers the set to the parameter compression unit 106, and the parameter compression unit 106 compresses the processing condition (input parameter values) of the learning data set (step S104). After that, the central processing unit 104 updates the learning data set by creating learning data including the compressed processing condition (compressed input parameter values) and the processing result (output parameter values) in the database 105 (step S105).

Hereinafter, an estimation process from parameter compression (S104) to convergence determination (S110) is repeated until the processing result (actual values) converges to the target processing result. In this way, the optimum processing condition for implementing the target processing result is searched autonomously.

Next, a method for compressing the input parameter in the parameter compression unit 106 will be described with reference to FIG. 4A. A processing condition 400 is illustrated in a first row (top row) of FIG. 4A. In this example, there are seven input parameters S to Y, and there are two steps 1 and 2, so that a total number of the input parameters is 14. The number of samples is three from #1 to #3. As a data compression method, for example, the following methods A to D can be considered.

The method A is a method for deleting the unused parameter or the parameter being a fixed value in all samples. A second row of FIG. 4A shows a compressed processing condition 401 in which the method A is applied to the processing condition 400. In this case, since an input parameter T is unused and an input parameter U is a fixed value in all the samples, the input parameters T, U in steps 1, 2 are deleted, and the number of input parameters in the compressed processing condition 401 becomes ten. The values of deleted control parameters are stored, so that the parameter restoration unit 109 can restore the deleted control parameter values.

The method B is a method for removing duplicate parameter values by leaving a small number (typically one) of the input parameters as representatives among the processing condition 400 in which the parameter values of all samples are the same in a plurality of steps. A third row of FIG. 4A shows a compressed processing condition 402 in which the method B is applied to the processing condition 400. In this case, since input parameters S, V, X are the same in steps 1, 2 in all samples, the duplicate input parameters S, V, X of step 2 are deleted, and the number of input parameters of the compressed processing condition 401 becomes eleven. The deleted parameter values are stored in a proportional coefficient a and an intercept b, so that the parameter restoration unit 109 can restore the deleted parameter values.

In the restoration method according to the present embodiment, as shown in FIG. 4B, a relationship of w=av+b between an input parameter value v of an input parameter α and an input parameter value w of an input parameter β is stored, thereby restoring input parameter values (w1, w2, w3) of each sample for the input parameter β based on input parameter values (v1, v2, v3) of each sample for the input parameter α (when the number of samples is three). FIG. 4B shows a generalized restoration method. In the method B, the input parameter α is limited to the parameters of step 1, the input parameter β is limited to the parameters of step 2, and the proportional coefficient a=1 and the intercept b=0.

The method C is a method in which a small number (typically, one) of input parameter groups having a proportional relationship are left as representatives and the others are deleted. A fourth row of FIG. 4A shows a compressed processing condition 403 in which the method C is applied to the processing condition 400. In this case, the input parameters V (10, 20, 20), X (20, 40, 40), Y (15, 30, 30) in step 1 and the input parameters S (10, 20, 20), V (10, 20, 20), X (20, 40, 40) in step 2 are directly proportional to the input parameters S (10, 20, 20) in step 1 (intercept 0), and Y (20, 30, 30) in step 2 is in a proportional relationship (intercept 10). In addition, the input parameters U (150, 150, 150) in step 2 is directly proportional to the input parameter U (100, 100, 100) in step 1. As a result, the input parameters V, X, Y in steps 1, 2 and the input parameters S, U in step 2 are deleted, and the number of input parameters of the compressed processing condition 403 becomes six. The deleted parameter values are stored in the proportional coefficient a and the intercept b, so that the parameter restoration unit 109 can restore the deleted parameter values.

The method D is a modification of the method C, and is a method in which a small number (typically, one) of input parameter groups having no proportional relationship but having a high correlation (a correlation coefficient is larger than a certain threshold value) are left as representatives, and the others are deleted. A fifth row of FIG. 4A shows a compressed processing condition 404 in which the method D is applied to the processing condition 400. In this case, in addition to the parameters deleted by the method C, the input parameter W in step 1 is deleted, and the number of input parameters of the compressed processing condition 404 becomes five. The deleted parameter values are stored in the proportional coefficient a and the intercept b fitting a straight line by a least-squares method, so that the parameter restoration unit 109 can restore the deleted parameter values.

As described above, the first number of parameters 14 can be reduced to 10 according to the method A, 11 according to the method B, 6 according to the method C, and 5 according to the method D. Further, as shown in a sixth row (lowermost row) of FIG. 4A, the number of parameters can be reduced to two by combining the method A and the method D.

In the present embodiment, when the number of input parameters is not equal to or less than a target number of parameters M specified by the user, a parameter number reduction process is executed. For example, when the input data is single-step, the method A is applied, and when the input data is multi-step, the method A and the method B are applied in combination. When the number of input parameters is not M or less at that stage, the method C is applied. When the target number of parameters is not reduced to M or less even after the method C is applied, the method D is applied. At this time, the threshold value of the correlation coefficient is automatically set, so that the number of input parameters when the method D is applied is equal to or less than the target number of parameters M.

When the processing condition is searched by using the compressed processing condition, the deleted input parameters values are sequentially restored according to a series of parameter compression methods applied to the searched compressed processing condition. That is, for the input parameters deleted by the method A, the stored value may be restored, and for the parameters deleted by the methods B to D, the stored proportional coefficient and intercept may be used to restore the representative value. However, in the case of the method D, since the compression is approximated, the restoration of the parameter is restoration with an approximate value.

Next, a method for speeding up a search in the processing condition search unit 108 will be described with reference to FIG. 5. The number of input parameters to be searched is M (in the example of FIG. 5, since the number of input parameters is five from X1 to X5, M=5). In the present embodiment, in order to perform a search at high speed, instead of simultaneously searching for M input parameters, only a small number N (N<M, where N is the number of partial search parameters) of input parameters are searched by the random search, and parameter values of a best sample in the learning data are fixed for the other (M−N) input parameters. In the example of FIG. 5, N=2, and the parameter values of the best sample are set for the remaining three input parameters. In FIG. 5, the input parameters using the values of the best sample are marked with *. Regarding the N input parameters, it is assumed that all combinations of the M input parameters are selected. In accordance with this, a search is performed for $_MC_N(=M!/(M-N)! N!)$ combinations. In this example, there are $_5C_2=10$ ways.

The values of the N parameters to be searched are given by random numbers according to a normal distribution in which an average is the value of the parameter in the case of the best sample, and a variance is a variance of all the samples. Assuming that a trial number of times of search for the selected N parameters is S, the number of search points X per one parameter is $X^N=S$, and therefore $X=S^{1/N}$, and a total number of searches T is expressed as $T=S \cdot _MC_N$.

FIG. 6 shows a relationship between the total number of searches T and the number of partial search parameters N when M=40 and X=3. When all the parameters are searched in round-robin for every three levels, the total number of searches is $3^{40} \approx 10^{19}$, but when N=4, the total number of searches can be approximate to $7 \times 10^6$, and the total number of searches can be reduced by 12 orders. As the value of the number of partial search parameters N increases, a possibility of obtaining a value close to the optimum solution becomes higher, but from a viewpoint of a calculation time, it is desirable to set N=4 to 5. As shown in FIG. 6, the total number of searches is worse at N=17 to 39 than at a case of the round-robin (N=40). This is because duplicate searches occur.

Since (M−N) of the input parameters obtained by this search method are the same as the values of the parameters of the best sample of the existing learning data, and when M=40 and N=4, 10% of the parameters to be searched is set as a new value. Further, in order to increase efficiency of the autonomous search, at the time of search, a plurality of candidates (typically 5 to 10) are estimated as recipe candidates (added input parameter values).

Hereinafter, a case where the processing apparatus 111 is an etching apparatus will be described as an example. FIG. 7 shows output parameters in this example, and each output parameter represents a cross-sectional shape after processing. The cross-sectional shape after processing is acquired by reading with the electron microscope (evaluation apparatus 112). In this example, the cross-sectional shape after processing is described using five output parameters: an upper portion width average value Y1, an intermediate portion width minimum value Y2, an intermediate portion width maximum value Y3, a lower portion width average value Y4, and a trench depth Y5.

FIG. 8 is an example of the target output parameter values input to the input device 103, and target values (dimensions) for the five output parameters Y1 to Y5 shown in FIG. 7 are given. A target shape indicated by the target output parameter values in FIG. 8 corresponds to a vertical trench structure having a width of 20 nm and a depth of 200 nm.

FIG. 9 is an excerpt of a table showing maximum and minimum values of the input parameters of the etching apparatus 111, which are stored in the database 105 in advance, and is determined by pre-setting of an engineer to be used or specifications of the apparatus. In this example, 72 input parameters can be set. Parameters include flow rate of various gases, gas pressure, microwave (MW) power, radio frequency (RF) power, temperature, etching time, and the like.

FIG. 10 is an example of the initial processing conditions (initial recipe) for one sample. The initial processing conditions are set by the engineer. In this example, a total number of samples is 16, of which 7 samples has 4 steps and 9 samples has 7 steps, which are multi-step processing conditions. In this way, the multi-step processing conditions with different numbers of steps may be mixed in the initial processing conditions. In this case, with respect to the samples having four steps, all the parameters of 5 to 7 steps are set to 0, so that the samples are treated as being regarded as seven steps. As described with reference to FIG. 9, the number of input parameters per step is 72, and the total number of control parameters to be finally set is 504.

FIG. 11 shows output parameter values (actual values) obtained by measuring a processing result by the evaluation apparatus 112 for 16 samples obtained by causing the etching apparatus 111 to perform a processing process according to the initial processing conditions shown in FIG. 10. None of the samples reaches the target shape of FIG. 8, but the best sample among these samples is a sample 12.

Therefore, the parameter compression unit 106 compresses the initial processing conditions. FIG. 12 shows results of sequentially applying the parameter compression methods A to D to the initial processing conditions. The target number of parameters M for the parameter compression processing is set to 40. By setting the threshold value of the correlation coefficient in the method D to 0.95, the 504 parameters existing in the initial stage can be finally reduced to 40, which has reduction effect of approximate to 92%. FIG. 13 shows 40 input parameters after the reduction. A set (in this example, 16 sets because of 16 samples) of the compressed initial input parameter values (FIG. 13), which are the initial processing conditions after compression, and the corresponding initial processing result (FIG. 11) constitutes initial learning data.

FIG. 14 shows 10 recipe candidates (compressed added input parameter values) searched by the processing condition search unit 108. In the search, 4 is set as the number of partial search parameters N. In FIG. 14, values different from the best sample are shown in an italic type, and in all the recipes, there are four parameters each shown in the italic type. A required time for search is approximate to one and a half hours on a personal computer (PC), and the search can be performed in a practical time.

The parameter restoration unit 109 restores the deleted control parameter values with respect to the compressed added input parameter values in FIG. 14, and restores the processing condition (added input parameter value) including the number of parameters of 504. The etching apparatus 111 performs the processing according to the input processing condition, and the evaluation apparatus 112 performs the evaluation, so that the processing result (added output parameter values) is obtained. For reference, FIG. 15 shows predicted output values for the ten recipe candidates of FIG. 14. The data is improved from the initial data shown in FIG. 11, but the target shape shown in FIG. 8 is not reached yet. When it is determined that the processing results (added output parameter values), which are the actual values, does not converge to the target processing result, the learning data set is updated by adding 10 sets of the processing condition (added input parameter values) and the processing results (added output parameter values) newly obtained according to the flow of FIG. 3, and the learning is performed again based on the learning of the model.

As a modification of the first embodiment, it is also possible to equip a control device of the processing apparatus with a function of the search device. FIG. 16 is a schematic view of a plasma etching apparatus having an optimum processing condition search function as an example of the processing apparatus. The plasma etching apparatus includes an antenna 56 for generating plasma, a radio frequency power supply 51 for applying a radio frequency voltage to the antenna 56, and a first radio frequency matching box 52. In order to introduce a plurality of gas types into a reactor 60, a first flow path 61 and a second flow path 62 are provided. Only two systems are shown here, but the number of flow paths is not particularly limited. A radio frequency alternating electromagnetic field generated in the antenna 56 acts on an introduced mixed gas to generate inductively coupled plasma 63 from reaction particles. Further, the apparatus includes a substrate voltage generator 54 and a second radio frequency matching box 53 for performing processing by the generated plasma 63. In addition, an end point determination device 55 capable of monitoring a fluctuation of the plasma generated at the time of processing a substrate (sample) 59 to be processed is provided, and a mechanism for feeding back a signal obtained by the end point determination device 55 to a first mass flow controller 57 and a second mass flow controller 58 is provided. The first mass flow controller 57 can adjust a gas flow rate in the first flow path 61 and the second mass flow controller 58 can adjust a gas flow rate in the second flow path 62 according to the signal of the end point determination device 55.

A control device 70 of the plasma etching apparatus controls plasma generation devices such as the radio frequency power supply 51, the substrate voltage generator 54, and the end point determination device 55 of the apparatus to perform the etching process on the substrate 59, and implements the processing program that is stored in the ROM 117 (FIG. 2) of the search device and corresponds to the search program for performing the search process, thereby performing the search process described in the first embodiment. When the search processing is performed, an input device 71 and an output device of the plasma etching apparatus perform functions corresponding to the input device 103 and the output device 114 of the search device (FIG. 1), respectively. As described above, the search device 100 is not independently provided for the processing apparatus 111, but one function of the processing apparatus 111 can be used to perform the search processing, and the plasma generation apparatus can be controlled based on the searched input parameter value to perform the etching processing.

Second Embodiment

In the first embodiment, the semiconductor manufacturing system including the processing apparatus for processing a semiconductor or a semiconductor device including a semiconductor is described as an example of the invention, but the search device and the search method of the invention can be applied not only to the semiconductor manufacturing system. As a second embodiment, an example in which a search device or a search method is applied to a processing molding system including an injection molding machine will be described. Components having substantially the same functions as those of the first embodiment are denoted by the same reference numerals, detailed description thereof will be omitted, and different portions will be mainly described.

FIG. 17 is a diagram showing a system configuration example of a processing molding system. A processing molding system 20 includes the search device 100, the input device 103, the output device 114, a molding apparatus 211, and a measurement apparatus 212.

The molding apparatus 211 is a device for molding various materials such as plastic materials. The molding apparatus 211 performs molding of a material based on the processing conditions (input parameter values) received from the search device 100, and transfers the molded material to the measurement apparatus 212. The measurement apparatus 212 measures dimensions of the material molded by the molding apparatus 211, and acquires machining shape data (output parameter value).

In the second embodiment, the search processing of the optimum processing condition is also performed according to the flow of FIG. 3. The target processing result is given as a target dimension (target output parameter value) indicating a shape of the molded material molded by the molding apparatus 211.

The output parameter used to specify the target dimension input to the input device 103 is performed by describing the shape of the molded material using a plurality of parameters, as in FIG. 8.

The database 105 stores in advance a table showing a maximum value and a minimum value of the input parameter of the molding device 211. This table has the same data structure as that of FIG. 9, and parameters, and the maximum value and the minimum value thereof are determined according to specifications of the molding apparatus. For example, when the molding apparatus 211 performs molding by forming one cycle including four processes of plasticization, injection, pressure holding, and cooling, and repeating these processes several times, it is necessary to set a control parameter (input parameter) for each process. For example, there are control parameters such as a cylinder temperature in the plasticization process, a motor rotation speed, a cylinder pressure, a screw speed in the injection process, a resin pressure in the pressure holding process, and a mold temperature in the cooling process, and a maximum value and a minimum value are defined for each of the control parameters.

FIG. 18 is an example of the initial processing conditions (initial recipe) for one sample. The initial processing conditions are set by the engineer. In this example, the number of cycles is three, the number of parameters in one cycle is six, and a total number of parameters is 18. The number of samples is 10 in total, 10 types of initial processing conditions are set, the molding apparatus 211 is caused to perform the processing, and an output parameter value (actual value, initial processing result) representing a processing result is acquired by the measurement apparatus 212.

Similar to the first embodiment, the parameter compression methods A to D are sequentially applied to the initial processing conditions, and the 18 input parameters are compressed until the number of input parameters becomes equal to or less than the target number of parameters M. For example, when the target number of parameters M=10, compressed initial input parameter values as shown in FIG. 19 are obtained, and learning of a prediction model is performed by using a set of the compressed initial input parameter value and a corresponding initial processing result as the initial learning data.

In this case, since the compressed initial input parameter is 10, the search may be performed for all the parameters, but in order to obtain a higher speed, it is desirable to set the number of partial search parameters N and perform a partial space search in the same manner as in the first embodiment.

The invention has been described above based on the embodiment. The invention is not limited to the above embodiments, and includes various modifications and equivalent configurations. For example, the embodiment described above has been described in detail for easy understanding of the invention, and the invention is not necessarily limited to those having all the configurations described above. A part of configurations of one embodiment can be replaced with another configuration. A configuration of another embodiment may be added to a configuration of a certain embodiment. Further, another configuration may be added to, subtracted from or replaced with a part of a configuration of each embodiment.

Further, parts or all of the configurations, functions, processing units, processing methods and the like may be realized by hardware, for example by designing with an integrated circuit, or may be realized by hardware, with a processor to interpret and execute a program that implements each function. Information such as a program, a table, and a file that implements each function can be stored in a storage device such as a memory, a hard disk, and a solid state drive (SSD), or a recording medium such as an integrated circuit (IC) card, an SD card, and a digital versatile disc (DVD).

Control lines and information lines according to the embodiment described above indicate what is considered necessary for description, and not all the control lines and the information lines are necessarily shown in a product. It may be considered that almost all the configurations are actually connected to each other.

REFERENCE SIGN LIST

10: semiconductor manufacturing system, 20: processing molding system, 51: radio frequency power supply, 52: first radio frequency matching box, 53: second radio frequency matching box, 54: substrate voltage generator, 55: end point determination device, 56: antenna, 57: first mass flow controller, 58: second mass flow controller, 59: substrate, 60: reactor, 61: first flow path, 62: second flow path, 63: plasma, 70: control device, 71: input device, 72: output device, 100: search device, 103: input device, 104: central processing unit, 105: database, 106: parameter compression unit, 107: model learning unit, 108: processing condition search unit, 109: parameter restoration unit, 110: device control unit, 111: processing apparatus, 112: evaluation apparatus, 113: convergence determination unit, 114: output device, 115: interface, 116: processor, 117: ROM, 118: RAM, 211: molding apparatus, 212: measurement apparatus

The invention claimed is:

1. A search device configured to search for an input parameter value to be given to a plurality of control parameters set in a processing apparatus, so that a processing result of a predetermined process performed by the processing apparatus satisfies a target output parameter value, the search device comprising:
- a processor;
- a memory;
- a search program stored in the memory and configured to be executed by the processor to search for the input parameter value satisfying the target output parameter value; and
- a parameter compression unit, a model learning unit, a processing condition search unit, a parameter restoration unit, and a convergence determination unit,
- wherein the parameter compression unit compresses first input parameter values so that the parameter restoration unit is capable of restoring the first input parameter values, and generates first compressed input parameter values in which the number of control parameters is reduced,
- wherein the model learning unit learns a prediction model from learning data that is a set of the first compressed input parameter values and first output parameter values that are processing results obtained by giving the first input parameter values, as the plurality of control parameters, to the processing device,
- wherein the processing condition search unit estimates second compressed input parameter values corresponding to the target output parameter values by using the prediction model,
- wherein the parameter restoration unit generates second input parameter values by adding control parameter values deleted by the parameter compression unit from the second compressed input parameter values, and
- wherein the convergence determination unit determines whether second output parameter values, which are processing results obtained by giving the second input parameter values, as the plurality of control parameters, to the processing device, converges to a predetermined range of the target output parameter values.

2. The search device according to claim 1, wherein
when the convergence determination unit determines that the second output parameter values does not converge to the predetermined range of the target output parameter values, the search program updates the prediction model by adding set of the second input parameter values and the second output parameter values to a set of the first input parameter values and the first output parameter values.

3. The search device according to claim 1, wherein
the predetermined processing includes a plurality of steps in which values given to the plurality of control parameters are different from each other, and
the search program searches for values of the plurality of control parameters to be set in the plurality of steps as the input parameter values.

4. The search device according to claim 1, wherein
the processing condition search unit estimates a plurality of the second compressed input parameter values by using the prediction model.

5. The search device according to claim 1, wherein
the parameter compression unit deletes a part of the values of the control parameters of the first input parameter values such that the number of control parameters of the first input parameter values is equal to or less than the target number of parameters.

6. The search device according to claim 5, wherein
the parameter compression unit deletes a value of a control parameter which is not used or is a fixed value among the first input parameter values, and stores the deleted value of the control parameter.

7. The search device according to claim 5, wherein
the parameter compression unit deletes a value w of the second control parameter while leaving a value v of the first control parameter among the first input parameter values, and stores values of a coefficient a and an intercept b of $w = av + b$.

8. The search device according to claim 7, wherein
the value w of the second control parameter is proportional to the value v of the first control parameter, and the value v of the first control parameter and the value w of the second control parameter have a correlation coefficient larger than a predetermined threshold value.

9. A plasma processing apparatus configured to perform plasma processing on a sample by using a plasma, the plasma processing apparatus comprising:
- a processing chamber;
- a plasma generation unit configured to generate the plasma inside the processing chamber; and
- a control device configured to execute a search program to search for an input parameter value to be given to the plurality of control parameters set in the plasma processing apparatus satisfying a target output parameter value, and to control the plasma generation apparatus to perform the plasma processing on the sample placed in the processing chamber based on the searched input parameter value,
- wherein the search program is configured to cause the control device to search for input parameter values to be given to the plurality of control parameters set in a processing device, so that a processing result of a predetermined process performed by the processing apparatus satisfies target output parameter values, by performing
  - a first step of compressing first input parameter values so that the first input parameter values can be restored, and generating first compressed input parameter values in which the number of control parameters is reduced;
  - a second step of learning a prediction model from learning data that is a set of the first compressed input parameter values and first output parameter values that are processing results obtained by giving the first input parameter values, as the plurality of control parameters, to the processing device;
  - a third step of estimating a second compressed input parameter values corresponding to the target output parameter values by using the prediction model;
  - a fourth step of generating second input parameter values by adding a control parameter values deleted by the first step from the second compressed input parameter values, and
  - a fifth step of determining whether second output parameter values, which are processing results obtained by giving the second input parameter values, as the plurality of control parameters, to the processing device, converges to a predetermined range of the target output parameter values.

10. The plasma processing apparatus according to claim 9, wherein
in the fifth step, when it is determined that the second output parameter values does not converge to the predetermined range of the target output parameter values, the prediction model is updated by adding a set of the second input parameter values and the second output parameter values to a set of the first input parameter values and the first output parameter values.

11. The plasma processing apparatus according to claim 9, wherein
in the first step, a part of the values of the control parameters of the first input parameter value is deleted such that the number of control parameters of the first input parameter value is equal to or less than the target number of parameters.

12. The plasma processing apparatus according to claim 9, wherein
in the third step, a value of a part of the control parameter of the first compressed output parameter values is changed, and a value of another control parameter is fixed to a value of a control parameter of learning data that gives an optimum solution among the learning data to search for an approximate solution.

* * * * *